United States Patent

[11] 3,557,323

[72] Inventor Christian Chalhoub
Paris, France

[21] Appl. No. 716,206
[22] Filed Mar. 26, 1968
[45] Patented Jan. 19, 1971
[73] Assignee C. I. T. Compagnie Industrielle Des Telecommunications
Paris, France
a corporation of France
[32] Priority Mar. 29, 1967
[33] France
[31] 100722

[54] SYSTEM FOR REMOTE SUPERVISION OF REPEATERS

18 Claims, 7 Drawing Figs.

[52] U.S. Cl. .......... 179/175.31
[51] Int. Cl. .......... H04b 3/46
[50] Field of Search .......... 179/175.31

[56] References Cited

UNITED STATES PATENTS 3,059,068 10/1962 Frankton et al. .......... 179/175.31

*Primary Examiner*—Kathleen H. Claffy
*Assistant Examiner*—Douglas W. Olms
*Attorney*—Craig, Antonelli, Stewart & Hill

ABSTRACT: A system for remote supervision of repeaters in a telecommunication line wherein each repeater includes a frequency generator supplying a frequency characteristic of the repeater, a control arrangement for passing the output of the frequency generator for all but one given level of an applied control signal and a rectifier device for producing the control signal proportional to the output of the primary amplifier in the repeater, the telecommunication line having an additional generator of a frequency of variable level connected to the input of the line and an indicator for detecting the level of the signal generated by the frequency generator of a particular repeater.

SYSTEM FOR REMOTE SUPERVISION OF REPEATERS

The invention relates to a device for the remote supervision of the gain of repeaters fitted to a telephone line, for example a landline or submarine cable.

The modern long-distance telephone links comprise a great number of repeaters, the gain of which must be controlled either for the purpose of performing a routine periodic check or for locating a fault. A general supervision of this kind can only be effected remotely, because an individual check of each and every repeater on the line by the operators is practically impossible, particularly in the case of a submarine cable, of which only the extremities are accessible.

A number of solutions have already been proposed for the problem of remote supervision of the repeaters of a multiplex telephone link. One of these consists of inserting a quartz crystal into the reverse-feedback circuit with which all repeaters are normally provided, which crystal suppresses or at least greatly attenuates the reverse feedback within a very narrow frequency band having a width of about 10 hertz, for example and centered on a frequency $f_i$ which is characteristic of a given repeater $R_i$. The resulting additional gain of the repeater $R_i$ due to the presence of the crystal in the feedback circuit thereof intensifies the noise in the corresponding narrow frequency band. At a terminal station, each noise frequency corresponding to one of the repeaters can be identified and measured with the aid of a selective neperometer. A noise frequency relating to a given repeater below a certain nominal level indicates a disturbance in the corresponding repeater.

A method of this kind provides satisfactory results for a limited number of repeaters; however, the sensitivity of the system is progressively reduced as the number of repeaters to be supervised increases. Let it be assumed, for example, that relative to a mean noise level of $N_o$ nepers (a unit of noise intensity of 8.686 decibels) output of a repeater, the effect of the aforementioned quartz crystal is to increase the level of a narrow noise band by 2 or 3 nepers. The result will be a hundredfold intensification of the noise in the given narrow band. However, if the link considered contains more than a hundred repeaters—which is frequently the case with submarine cables—the increment of noise produced by a quartz crystal inserted into a repeater will not be distinguishable from the background noise of the link.

Another method currently used for locating a faulty repeater consists of injecting into the line for each repeater a locally generated frequency, characteristic for the repeater considered.

The present invention provides a different method for the remote supervision of repeaters which yields more reliable and specific results than the methods described in the foregoing. Furthermore, this method can be carried out with relatively simple equipment.

In the following description, the term "exploratory frequency" will be employed to designate a frequency which may be varied at will over the entire transmitted band.

A repeater $R_i$ of rank $i$, essentially comprises an amplifier and frequency-selective means. According to the invention there is provided a remote supervision device for a telecommunication line, each of whose repeaters is provided with a generator of a fixed-frequency $f_i$ characteristic of the individual repeater, and of which at least one extremity is connected to a generator of a variable frequency $f$ capable of covering the transmitted band as well as to a variable selective receiver. A repeater of rank $i$ is equipped with an amplifier and rectifying means connected to the output of the aforesaid amplifier, capable of supplying a DC polarizing voltage V as a function of the level of the aforesaid frequency $f$ at the output of the amplifier. Further, the system provides for the generator of the fixed frequency $f_i$ to functionally cooperate with means for blocking said frequency $f_i$ at a predetermined value $V_o$ of the polarizing voltage V, and also with means for applying said frequency $f_i$ at any other value of the polarizing voltage V to the input of the aforesaid amplifier.

It is of course understood that the value of the predetermined level will be selected substantially higher than the mean value of transmissions in the multiplex link, but still below the saturation value. Advantageously, the value selected will be that of the crest, reached during the .01 percent of the time, in accordance with the international conventions.

In this manner, during normal functioning, a characteristic frequency $f_i$ of a repeater will exist in the transmitted spectrum. At a terminal station, a checking operation will consist of applying to the extremity of the cable, with an exploratory frequency $f$, a level such that the frequency $f_i$ is eliminated from the received spectrum. Consequently, it will be possible to observe for any repeater within the entire transmitted band the equivalent-frequency curve of the line section comprised between the transmitting terminal station and the output of the repeater concerned based upon the amplified level of the signal of frequency $f$. Thus, the operation of the repeater can be supervised by determining the level of the signal of frequency $f$ required to eliminate the signal of frequency $f_i$ from the received spectrum.

The invention will now be described with reference to the accompanying drawings, which illustrate the invention but in no restrictive sense.

Figure 6A:
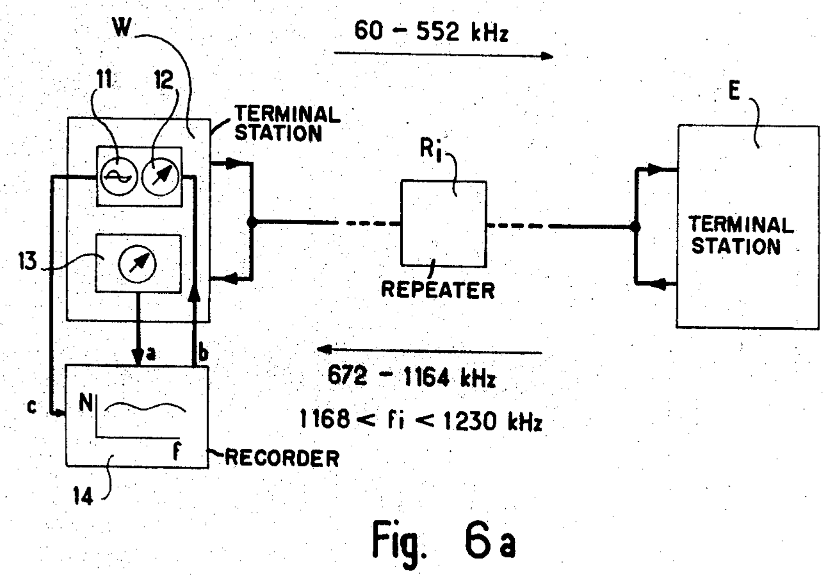
Figure 6B:
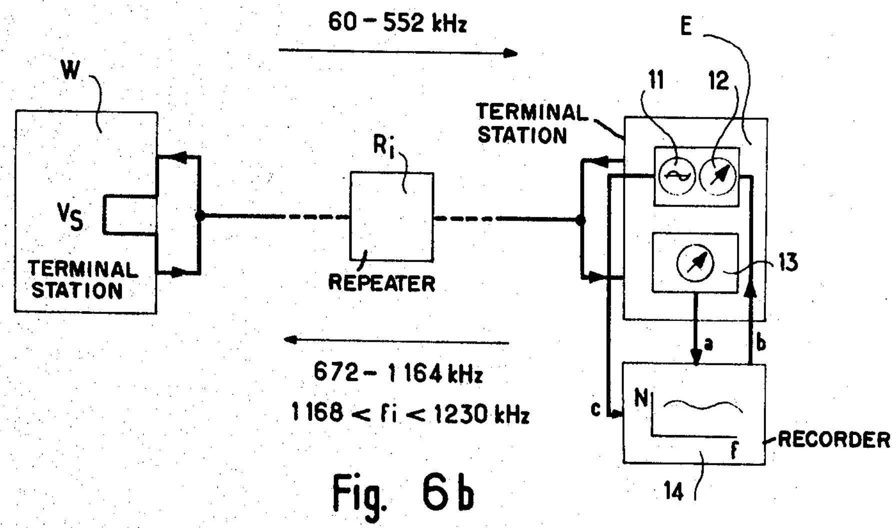

FIG. 6*a* is general diagram of a complete link, equipped according to the invention;

FIG. 6*b* is another example of the general diagram.

Figure 1:
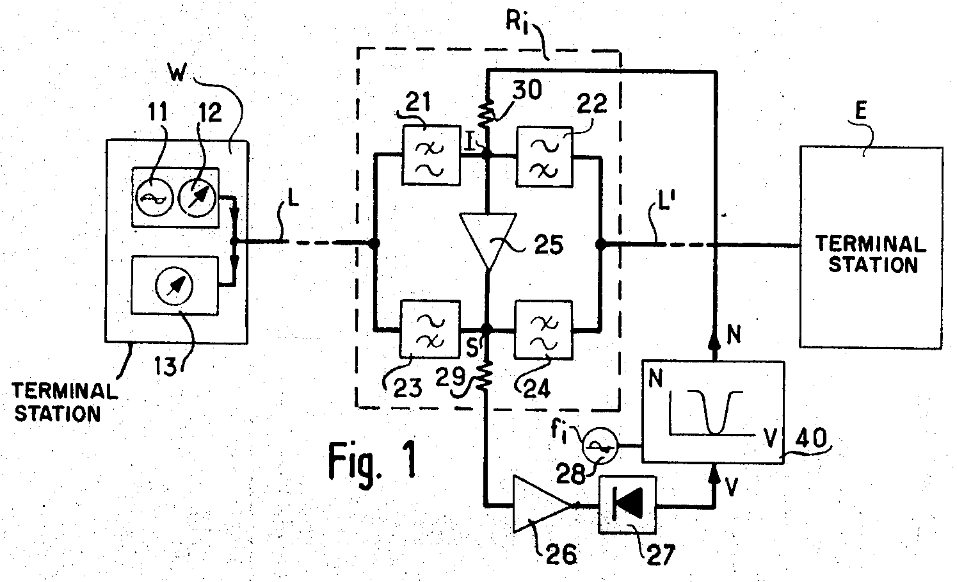
FIG. 1 is a schematic single-wire diagram of a remote-supervision installation for repeaters, in its general form.

Referring now to the drawings, FIG. 1 shows a repeater $R_i$ inserted into a telephone line, for example a submarine cable L—L'. It comprises, in a known manner, an amplifier 25 with input terminal I and output terminal S, two low-pass filters 21 and 24, and two high pass filters 22 and 23, the arrangement of filters effecting the amplification of a low frequency band in the direction W—E and of a high-frequency band in the direction E—W, where W and E designate the terminal stations, respectively.

The device according to the invention comprises a wideband amplifier 26 connected to the output S of amplifier 25, preferably through a decoupling resistance 29. The output of the amplifier 26 is connected to a detector and filter circuit 27, whose output supplies a rectified or DC polarizing voltage V having a level proportional to the output level from amplifier 25. An oscillator 28 emits a current of frequency $f_i$, characteristic of the repeater $R_i$. This current is transmitted by an element 40, to which the polarizing DC voltage V is applied as a control voltage. The element 40 has an output terminal which is connected to the input terminal I of the amplifier 25, for example through a decoupling resistance 30. For a value of the control DC voltage V between $V_o - \Sigma$ and $V_o + \Sigma$, the alternating current level of output N is negligible; whereas, for other values of the voltage V, a finite value N is applied to terminal I.

At a terminal station, for example at station W, there is mounted an apparatus comprising a generator 11, variable with regard to frequency and level, the level being measured and displayed on a meter 12. This generator 11 transmits to the extremity of the cable a current of exploratory variable frequency $f$, i.e. variable within the transmitted frequency band, and of a known level. The terminal apparatus also comprises, for the output terminals of the line at the extremity W a selective level indicator 13, which can be tuned to any one of the characteristic frequencies $f_i$ of the various repeaters contained in the link. In principle, the selective indicator 13 need not be level-calibrated, because it operates solely on an all or nothing basis.

The operation of the system of FIG. 1 is as follows:

For an arbitrary value of the emission level of the generator 11, tuned to an exploratory frequency $f$, e.g. of a low value, the amplifier 26 has an output level which, after detection in the element 27, supplies a polarizing voltage V which biases the element 40 in the passing state. Thus, the frequency $f_i$ is injected at the input of amplifier 25 and returns to the terminal station W (by a process which will be discussed in detail with reference to FIGS. 6*a* and 6*b*). By setting the indicator 13 to the frequency $f_i$, the return of a signal having a frequency $f_i$ can be detected.

By increasing gradually the emission level of generator 11, there will be obtained a reception level at the output of amplifier 25 such, that for a DC control voltage $V_o$, the element 40 will be brought into its nonpassing state represented by a zero level detected by indicator 13. This then gives a reading instrument 12 of the corresponding emission level $N_i$. If the repeater is not functioning properly, the nonpassing state of element 40 will be achieved at an incorrect level N or may not be achieved at all.

If the critical level $N_i$ is slightly exceeded, for example by a decineper, a reading of frequency $f_i$ will again be obtained. Accordingly, the element 40 operates in the manner of a single-level analyzer. By scanning at the exploration frequency $f$ the entire transmitted frequency band, it will be possible to plot by points the values of $N_i$ for each frequency $f$ forming the characteristic curve of repeater $R_i$ in its entirety.

By setting the selective indicator 13 to other frequencies $f_i$, being characteristic of other repeaters $R_i$, it will be possible to trace successively the characteristic of all line sections comprised between the extremity W and the output of each of the repeaters of the link.

In a specific example, it is assumed that the mean level of a multiplex signal at the output of the repeater is +5 *d*N, that the level of the crest at the output (reached within less than .01 percent of the time) is +20 *d*N. The parameters will be so selected, that the reference level at the output for reaching the zero transmission band of the transmitting element 40 will be +20 *d*N (equal to the crest level), and that the level of frequency $f_i$ is −25 *d*N, for example. Such a difference between the frequency level $f$ and the level of frequency $f_i$ (45 *d*N) ensures that only the exploratory frequency $f$ is effective in determining the nonpassing state of element 40, it being understood that the measurement is carried out in the absence of the multiplex signal itself or at least during a period when the traffic is low enough to permit the power of the multiplex signal to be neglected relative to that of the measuring frequency.

Figure 2:
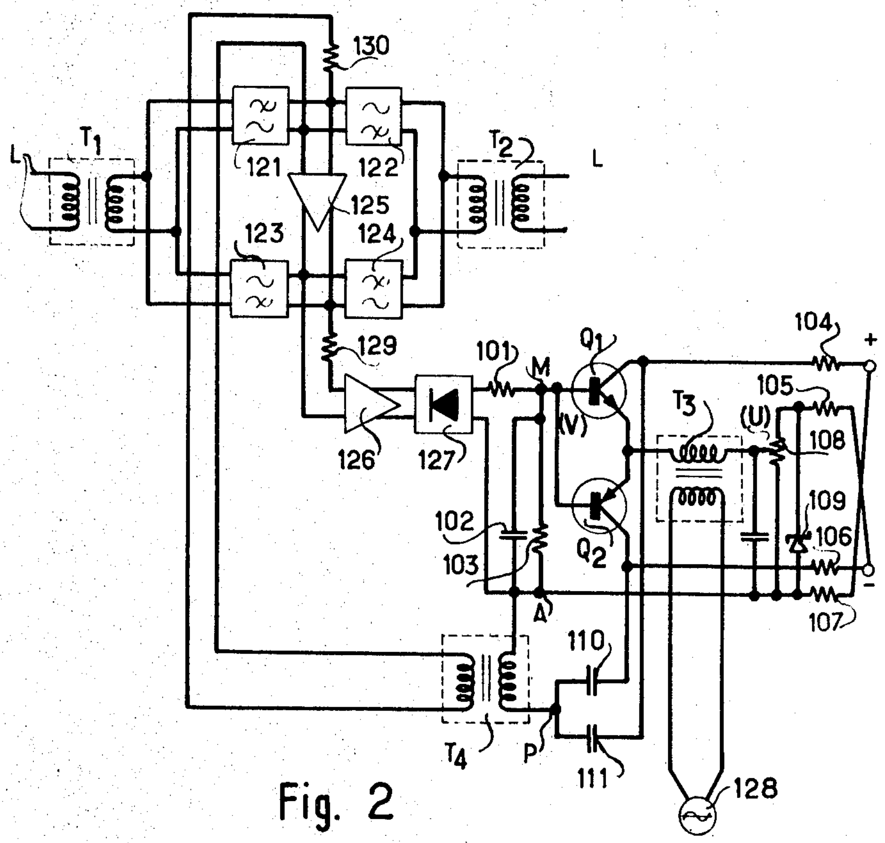
FIG. 2 is a more detailed schematic two-wire diagram of a part of the installation according to a first embodiment of the invention.

FIG. 2 is a two-wire diagram of the equipment of a repeater $R_i$ according to a first embodiment of the element 40. The elements 121, 122, 123, 124, 125, 126, 127, 128, 129 and 130 correspond respectively to the elements 21 through 30 of FIG. 1. The repeater is inserted into the line L—L′ between two transformers $T_1$ and $T_2$.

The detector element 127 feeds into an RC network made up of resistor 101, capacitor 102, and resistor 103, having an intermediary point M. Two complementary transistors $Q_1$ (NPN) and $Q_2$ (PNP) have their bases connected in common at point M. The collector of $Q_1$ is connected to the positive pole of a DC source by a resistor 104; the collector of $Q_2$ is connected to the negative pole of the same source via a resistor 106. The combined emitters of the two transistors receive a reference polarization U, adjustable by means of a potentiometer 108, fed by a stabilized source constituted by a source which may be the same as the one mentioned above, and further by two resistances 105 and 107 and a Zener diode 109.

The output amplified by the transistors $Q_1$ and $Q_2$ is extracted by means of two capacitors 110 and 111 connected in series between the two collectors and by means of a transformer $T_4$, one coil of which is connected between a point P between the two capacitors, and a fixed point A carrying a DC voltage. The other coil of said transformer $T_4$ is connected to the terminals of the amplifier 125 through the decoupling resistance 103.

The excitation of the two transistors $Q_1$ and $Q_2$ at frequency $f_i$ is effected by the oscillator 128 through the intermediary of a transformer $T_3$ which acts on the two parallel-connected emitters.

The operation of the system of FIG. 2 is as follows:

With the base-emitter voltage of $Q_1$ below approximately +0.6 volts, the junction is closed and the transistor $Q_1$ is blocked. When this voltage slightly exceeds +0.6 V, the transistor $Q_1$ suddenly becomes conducting and amplifying. With the base-emitter voltage of $Q_2$ greater than approximately −0.6 V, the junction is closed, the transistor $Q_2$ is blocked. When the voltage falls slightly below −0.6 V, the transistor $Q_2$ suddenly becomes conductive and amplifier.

Taking the point A of FIG. 2 as the reference point for the voltages, if the reference polarization U of the transistors as determined by the setting on potentiometer 108 is fixed for example at −6.0 V, for a voltage at M of $V_M$ comprised between −5.4 V and −6.0 V, the transistor $Q_1$ amplifies while the transistor $Q_2$ is blocked. For $V_M$ comprised between −5.4 V and about −6.6 V, transistor $Q_2$ amplifies while the transistor $Q_1$ is blocked.

Figure 3:
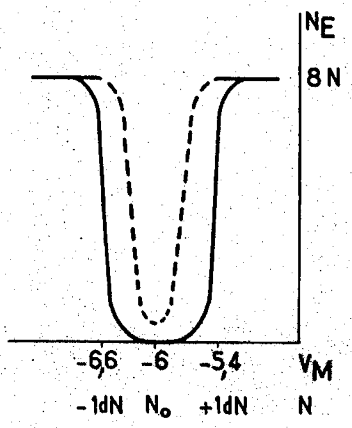
FIG. 3 is a graph, illustrating the functioning of the devices represented in FIG. 2 and in FIG. 4.

The resulting curve drawn in full lines in FIG. 3 shows, as a function of the voltage $V_M$, a trough-shaped response curve having a trough depth of the order of 8 nepers. At the level of the emission $N_E$, this corresponds to a trough width of ±1 *d*N.

Figure 4:
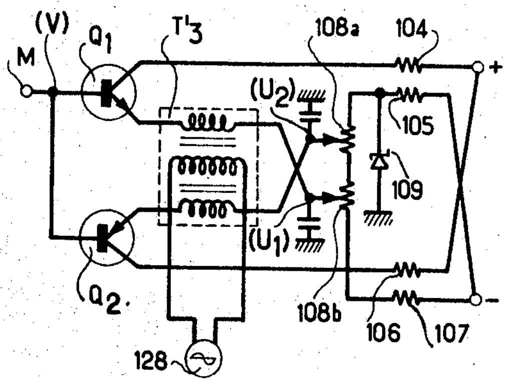
FIG. 4 is a variation of a portion of the circuit of FIG. 2.

A narrower curve trough can be obtained (as drawn in broken lines) by polarizing the two emitters at slightly different values $U_1$ and $U_2$, by means of the circuit shown in FIG. 4, wherein the potentiometer 108 of FIG. 2 is replaced by two potentiometers 108*a* and 108. In this case, the two-coil transformer $T_3$ of FIG. 2 is replaced by a three-coil transformer $T'_3$. There is obtained in this manner, with an attenuation value hardly below that of the preceding case, a trough width of the order of ±0.4 *d*N.

Under these conditions, by reading two points on either side of the bottom of the trough, of equal level, it will be a very simple matter to determine the level of the exploratory frequency which produces extinction, within ±0.1 *d*N.

Other bridge-type circuits in which the equilibrium (i.e. the nontransmission) is obtained for a predetermined value of the voltage detected at the output of the amplifier 26 of FIG. 1 are also possible within the scope of the present invention.

Figure 5:
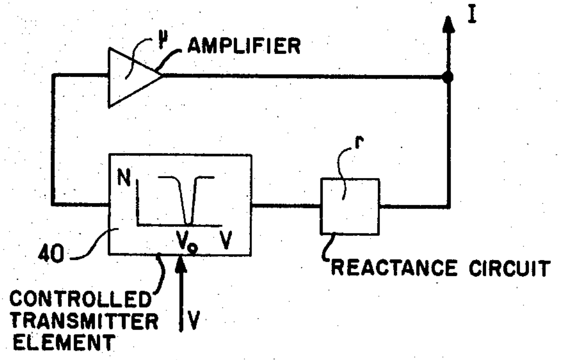
FIG. 5 illustrates a second embodiment of the invention.

FIG. 5 illustrates another embodiment, in which the circuit 40, operating as a "single-level amplitude analyser," is incorporated directly into the oscillator providing the characteristic frequency $f_i$. Since an oscillator can be schematized as an amplifier circuit $\mu$ in combination with a reactance circuit $r$, FIG. 5 shows an oscillator diagram incorporating the object of the invention, in which the element 40 is inserted in series between the output of circuit $r$ and the input of the circuit $\mu$. FIG. 5 should be considered in conjunction with FIG. 1; for a predetermined value $V_o$ of the DC voltage, the transmission of element 40 ceases, the oscillator stops oscillating, and the amplifier 25 (FIG. 1) ceases to receive the frequency $f_i$ at its input terminal I.

The FIGS. 6*a* and '*b* illustrate examples of application of the device according to the invention, in the case of a two-wire link, for example a submarine cable. In accordance with a practical case, it is assumed that a range of low frequencies, 60—552 kHz. is allocated to the direction W—E on a link, and that a range of high-frequencies, 672—1164 kHz. to the direction E—W. It is further assumed that the characteristic frequencies employed for the remote supervision are within the range 1168 —1230 kHz.

Under these conditions, FIG. 6*a* shows an installation of the apparatus for supervising the low-frequency range repeaters. The generator 11 and the voltmeter 12 are connected to the input of the link at the extremity W, and the selective indicator is connected to the output of the same extremity. In fact, each of the frequencies $f_i$ fed into the line by the repeaters conforms to the process of the high-frequency range, i.e. returns towards W.

For readings in the high-frequency range, according to FIG. 6*b*, a corresponding apparatus is installed at the extremity E. The characteristic frequencies travel to the extremity W as previously. There they are isolated and applied to one or several maintenance loops $V_S$, which are always provided in a multiplex frequency link, and the frequencies transferred to a maintenance loop are returned to the extremity E.

In all cases, by varying the exploratory frequency in the transmitted band, the equivalent-frequency curve of the link can be traced at the output of any repeater on the line.

The device according to the invention can be easily adapted for an automatic remote recording of the gain-frequency curves of the repeaters. To this end, it suffices to link the instruments 11, 12 and 13 with an apparatus 14, the construction of which is well known and which carries out the following functions:

1. Automatically adjusting the injection level of signal *f* to reduce the output level 13 to zero.

2. Recording of the injection level 12 as function of the exploratory frequency 11.

These actions are symbolized by the arrows *a*, *b* and *c*, linking the apparatus 14 with the instruments 13, 12 and 11 respectively.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims

I claim:

1. A system for remote supervision of at least one repeater in a telecommunication line, the repeater including a primary amplifier for amplification of signals on said line, said system comprising:

first frequency generator means in said repeater for generating a first frequency signal;

rectifier means connected to the output of said primary amplifier for providing a DC control signal whose level is proportional to a signal amplified by said primary amplifier;

control means connected to said first frequency generator means and responsive to said DC control signal for blocking the signal of said first frequency generator means for a given value of said DC control signal and for passing said signal therethrough to be delivered to a remote point for substantially all other values thereof;

second frequency generator means connected to the input of said primary amplifier from said remote point via said telecommunication line for generating a second frequency signal with a variable level; and detecting means connected to said line at said remote point for detecting the presence of said first frequency signal of said line.

2. A system as defined in claim 1 wherein a plurality of repeaters are connected in said telecommunication line, each repeater including individual rectifier means, first frequency generator means generating a signal whose frequency identifies said repeater, and control means capable of being biased in the blocking state at a level of said DC control signal characteristic of said repeater.

3. A system as defined in claim 1 wherein said control means includes amplifier means having a trough-shaped gain curve with a sharply defined minimum at substantially zero gain for said given value of said DC control signal.

4. A system as defined in claim 3 wherein said amplifier means includes first and second amplifiers and bias voltage means for biasing said first and second amplifiers so that said first amplifier is cutoff above a voltage level $V_o - \Sigma$ and said second amplifier is cutoff below a voltage level $V_o + \Sigma$, where $V_o$ is said given value of said control signal at which said control means is blocking and $\Sigma$ is a voltage quantity small in relation to $V_o$.

5. A system as defined in claim 4 wherein said first and second amplifiers comprise at least two complementary transistors, the bases of which are connected together to said rectifier means, and means for coupling the output of said first frequency generator means to the emitters of said transistors, the collectors of said transmitters being connected to respective bias voltages.

6. A system as defined in claim 5 wherein the emitters of said transistors are connected together to a common bias potential in said bias voltage means.

7. A system as defined in claim 5 wherein the emitters of said transistors are connected separately to individual bias potentials in said bias voltage means.

8. A system as defined in claim 1 wherein said control means is included in said first frequency generator means and serves to prevent generation of said first frequency signal for said given value of said control signal applied thereto.

9. A system as defined in claim 1 wherein said second frequency generator means includes regulating means operatively associated with said detecting means for automatically adjusting the level of said second frequency signal to the value wherein said first frequency signal is no longer detected by said detecting means.

10. A system as defined in claim 9 wherein said regulating means includes recording means for recording the level of the second frequency signal at which said first frequency is no longer detected by said detecting mean for all frequency values of said second frequency signal.

11. A repeater for use in a telecommunication line comprising:

a primary amplifier and frequency selective means connected to the input and output of said amplifier for directing signals thereto and therefrom, respectively;

frequency generator means for generating a first frequency signal;

rectifier means connected to the output of said primary amplifier for providing a control signal whose level is proportional to a signal amplified by said primary amplifier; and control means connected to said frequency generator means and responsive to said control signal for blocking the signal of said frequency generator means for a given value of said control signal and for passing said signal therethrough for substantially all of the values thereof.

12. A repeater as defined in claim 11 wherein said control means includes amplifier means having a trough-shaped gain curve with a sharply defined minimum at substantially zero gain for said given value of said control signal.

13. A repeater as defined in claim 12 wherein said amplifier means includes first and second amplifiers and bias voltage means for biasing said first and second amplifier so that said first amplifier is cutoff above a voltage level $V_o - \Sigma$ and said second amplifier is cutoff below a voltage level $V_o + \Sigma$, where $V_o$ is said given value of said control signal at which said control means is blocking and $\Sigma$ is a voltage quantity small in relation to $V_o$.

14. A repeater as defined in claim 13 wherein said first and second amplifiers comprise at least two complementary transistors, the bases of which are connected together to said rectifier means, and means for coupling the output of said first frequency generator means to the emitters of said transistors, the collectors of said transmitters being connected to respective bias voltages.

15. A repeater as defined in claim 14 wherein the emitters of said transistors are connected together to a common bias potential in said bias voltage means.

16. A repeater as defined in claim 14 wherein the emitters of said transistors are connected separately to individual bias potentials in said bias voltage means.

17. A repeater as defined in claim 11 wherein said control means is included in said first frequency generator means and serves to prevent generation of said first frequency signal for said given value of said control signal applied thereto.

18. A repeater as defined in claim 11 wherein said first frequency signal has a frequency outside of the communication band of said telecommunication line.